United States Patent [19]

Bleckmann

[11] 4,047,766
[45] Sept. 13, 1977

[54] DIGITAL PHASE-LOCKED LOOP FOR SPEED MEASUREMENT, IN PARTICULAR FOR USE IN ANTISKID CONTROL SYSTEMS

[75] Inventor: Hans-Wilhelm Bleckmann, Frankfurt, Germany

[73] Assignee: ITT Industries, Inc., New York, N.Y.

[21] Appl. No.: 682,818

[22] Filed: May 3, 1976

[30] Foreign Application Priority Data

May 3, 1975 Germany ............................ 2519867

[51] Int. Cl.² ............................................. B60T 8/08
[52] U.S. Cl. ...................................... 303/97; 303/20; 307/233 B; 324/161; 361/238
[58] Field of Search ................... 303/91, 95, 97, 106, 303/109, 20; 307/233 B; 324/162, 161; 317/5; 235/151.32, 150.2, 150.24; 331/1 A; 328/155; 361/238

[56] References Cited

U.S. PATENT DOCUMENTS

| | | | |
|---|---|---|---|
| 3,746,925 | 7/1973 | Schaepman | 317/5 |
| 3,838,889 | 10/1974 | Miller | 303/20 |
| 3,843,210 | 10/1974 | Portas | 303/97 |

*Primary Examiner*—Trygve M. Blix
*Assistant Examiner*—Reinhard J. Eisenzoff

*Attorney, Agent, or Firm*—John T. O'Halloran; Thomas M. Marshall

[57] ABSTRACT

A digital phase-locked loop for speed measurement, in particular for use in antiskid control systems, for the conversion of the frequency of an input pulse sequence, proportional to a speed, into a digital numerical value to be used in the digital arithmetic unit for an antiskid control system is provided wherein there is a certain numerical value which will always be the same which is allocated to any input pulse sequence and which can be applied to a first storage register and added to the contents therein. At regular intervals, determined by a clock generator, a positive digital output numerical value is generated by a detector if the content of the first storage register is above a predetermined upper limit and a negative digital output numerical value will be generated if the contents of the first storage register are below a predetermined lower limit. Furthermore, the respective digital output numerical value of the detector can be added to the content of a second storage register, observing a correct sign. The contents of the second storage register are at digital numerical value corresponding to the frequency of the input pulse sequence, with that digital numerical value always being subtracted from the content of the first storage register upon each clock pulse generated by the clock generator.

13 Claims, 4 Drawing Figures

4,047,766

DIGITAL PHASE-LOCKED LOOP FOR SPEED MEASUREMENT, IN PARTICULAR FOR USE IN ANTISKID CONTROL SYSTEMS

BACKGROUND OF THE INVENTION

1. Field of the Invention

Control signal generating devices for antiskid control systems utilizing a digital arithmetic unit governed by a device which converts input pulse sequences into a digital numerical value.

2. Prior Art

The device of this invention relates to a digital phase-locked loop, in particular for use in antiskid control systems for the conversion of a frequency of an input pulse sequence which is proportional to a speed into a digital numerical value utilized in a digital arithmetic unit for the purpose of operating a hydraulic control as a part of an antiskid system.

If the frequency or frequency change of an input pulse sequence is to be utilized in a digital arithmetic unit the frequency change must always be converted into a digital numerical value. Digital arithmetic units utilized in antiskid control systems require an extremely rapid conversion of momentary frequency or frequency change.

From U.S. Pat. No. 3,746,925 (assigned to the assignee of this invention), an antiskid control system is described wherein the individual periods of a constant frequency are counted by means of a fixed number of input pulses. The counting result of such an interval is predetermined by a fixed number of input pulses which permits determinations to be made with regard to the average wheel speed during the counting interval. At the same time a comparison of two subsequent intervals permits determinations with regard to the change in speed, in other words to the change in frequency of the input pulses. It is thus obvious that such a counting interval must last for several periods at the slowest frequency of the input pulse sequence. Accordingly, it takes a relatively long time before the arithmetic unit of the antiskid control system disclosed permits a determination of a suitable value and therefore a rapidly reacting, and hence exact antiskid control, is impossible with that device if only for this reason alone.

U.S. Pat. No. 3,805,089 discloses a device referred to previously above wherein with any input pulse emanating from a wheel sensor, a digital numerical value is available which is representative of the wheel speed. This is achieved by means so that upon the arrival of any input pulse the contents of a first storage register are compared with a fixed value. The difference resulting therefrom is routed to a second register which will add the difference to its contents observing the correct signs. Now the content of the second register are read into the first storage register i.e. added to the contents of the first storage register, in other words added up to the content of the first storage register with a constant high frequency. A comparison is made of the contents of the second storage register with the fixed value and at the same time the contents of the second storage register are reset or zeroed. Due to this feedback of the difference through the two storage registers the difference being ascertained by a comparator, it results that the difference corresponds to the acceleration of the wheel speed. Due to the integrating behavior of the second storage register the contents of the second storage register represents the momentary or the instant wheel speed in the form of a digital value. Thus in the device of U.S. Pat. 3,805,089, a digital value is always available which represents the speed or velocity which is corrected upon the arrival of any input pulse. With the device illustrated and described in U.S. pat. 3,805,089, there exists a decisive disadvantage in that upon a sudden locking of the wheel the frequency of the input pulse becomes zero and no comparison triggering input pulse is available at the comparator. Thus in this event it is also impossible to form any difference between the content of the first storage register and the fixed value, as a result of which the contents of the second storage register cannot be corrected. The second storage register thus would permanently feed a signal to the subsequent computing circuit which, despite the stop of the wheel, will correspond to a wheel speed which was in existence immediately before. At the same time the contents of the first storage register would continue to rise until it will overflow.

SUMMARY OF THE INVENTION

It is the object of this invention to convert an input pulse sequence having a frequency which is proportional to the speed of a rotatable part into a digital value, even if there is a sudden stopping of the rotatable part with the result that the digital value is reduced to zero. In addition, the digital value which in accordance with the device of this invention is corrected by a generating clock timing signal frequency which is higher than the frequency of the input pulse frequency. The object of this invention is solved by the device and by the method disclosed.

Specifically, the device disclosed includes a digital phase-locked loop for speed measurements in particular for use in an antiskid control system for the conversion of frequency of an input pulse sequence which is proportional to a speed of a rotatable part into a digital numerical value useful in a digital arithmetic unit. A first storage register is provided which has an input of a preselected specific numerical value which will always be the same and is allocated to any input pulse sequence which is added to the contents of the first storage register. Furthermore, at regular intervals determined by clock generator, a positive digital output numerical value is generated by a detector if the contents of the first storage register are above a predetermined upper limit and furthermore a negative digital output numerical value will be generated if the contents of the first storage register are below a predetermined lower limit. In addition, the respective digital output numerical value of the detector can be added to the contents of a second storage register, observing a correct sign. The contents of the second storage register are the digital numerical value corresponding to the frequency of the input pulse sequence, with the digital numerical value always being subtracted from the contents of the first storage register upon each clock signal generated by the clock generator.

It is of particular advantage if the clock signal frequency of the clock generator at least equals or exceeds the highest frequency which is to be converted into a digital numerical value. Additionally, it is advantageous if the digital numerical value obtained from the second storage register is an input to an adder by means of a constant factor. Preferably, the designed digital numerical value is a serial binary number and the storage registers are designed as shift registers.

In a further embodiment the clock generator is subdivided into a master clock signal generator having a digit capacity of 0 to x, also, the storage registers are designed as shift registers having equal digit capacity of 0 to x operating with primarily operating adders connected in series and having carry over function.

Specifically, a form of this invention which is particularly advantageous provides that a master clock pulse generated by the clock generator is led to all serial operating elements as well as to a divider which cyclically distributes the master clock pulse to weighting lines so that a digit pulse can be generated which will define a certain digit value at any time in the computing cycle and furthermore that input pulse will always be available at a gate circuit during the entire subsequent computing cycle, the gate circuit being openable for the coding of the input pulses by means of a digit pulse available at one or several weighting lines. In one form of the device as described above the upper and lower limits in the first storage register are commonly defined by the change in signs of the binary number content in the first storage register. Specifically, the device can be operated so that the lower limit in the first storage register can be defined by 0 with the upper limit being defined by a positive value determinable at random.

In the embodiment referred to above where a master clock is subdivided and corresponds to digit capacity of 0 to x, the device operates so that the sign is always different by the highest value digit and further in that a gate circuit which performs the function of a detector has a following D-flip-flop connected to the first storage register between an adder and a shift register with the gate circuit being openable by the highest value digit clock pulse which is also led to the clock input of the D-flip-flop in that a Q-output of the D-flip-flop is directly connected with the adder of the second storage while the $\overline{Q}$ output is connectable with a second adder via another gate circuit which is openable by the weighting line of the lowest value digit.

A further modification of the device described above is wherein the master clock pulse generated by the clock pulse generator is applied serially to all operating elements as well as the divider which cyclically distributes the master clock pulse to weighting lines B-0 to B-X. It is preferable that the sign is always defined by the highest value digit. Furthermore, there is provided a D-flip-flop connected to the first storage register between a first adder and a shift register via a gate circuit which is opened by the highest value digit pulse with the Q output of said D-flip-flop being connected to the adder of the second storage register. Furthermore, a first input of a further adder is connected at the first storage register between the first adder and the first shift register with the second input of the further adder receiving the negative or referred to binary number representing the upper limit. Also an output of the further adder is connected with a second D-flip-flop via another gate circuit with an inverted output which is also openable by the highest value digit clock pulse with the Q-output of the second D-flip-flop being connected with the adder associated with the second storage register via a gate circuit which is opened by the lowest value digit clock pulse.

A particular advantage of the device of this invention is that it permits an extremely simple construction which allows for the use of extremely inexpensive and highly reliable working components.

BRIEF DESCRIPTION OF THE DRAWINGS

Further advantages of the device of this invention will be evident from the following description of the embodiments illustrated in the accompanying drawings, in which.

DESCRIPTION OF THE PREFERRED EMBODIMENT

Figure 1:
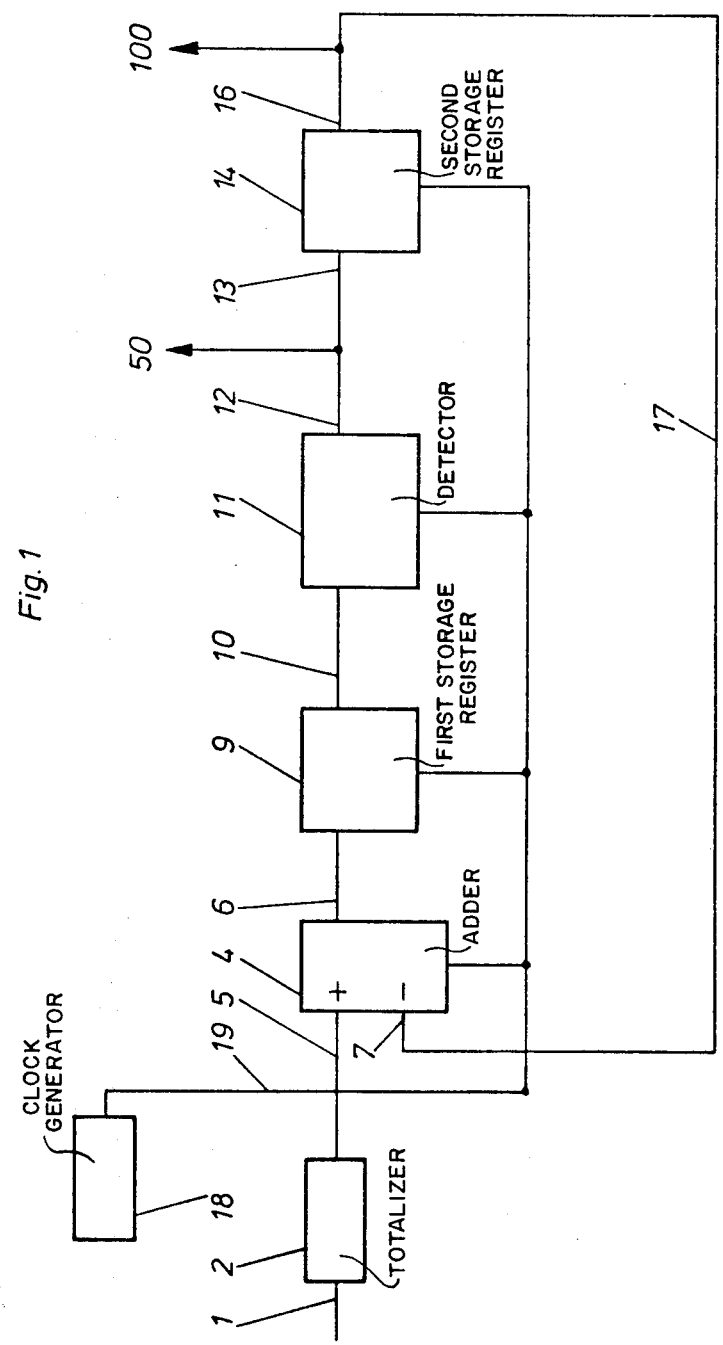
FIG. 1 is a block diagram illustrating the basic principles of the device of this invention.

In FIG. 1, a totalizer 2 is provided which is supplied with an input line 1 from a sensor associated with a rotating wheel to be braked, similar to that illustrated in FIG. 1 of U.S. Pat. No. 3,746,925, the entirety of the disclosure of which is incorporated herein by reference. The totalizer 2 is connected by input line 5 to an adder 4. The output line 6 of adder 4 is connected with storage register 9. The output line 10 of storage register 9 is connected with a detector 11. A second storage register 14 and a branch line 50 are connected as illustrated at an output of detector 11. The connecting line 50 leads to an arithmetic unit of the type similarly illustrated in U.S. Pat. No. 3,746,925 which may take several forms and is not illustrated herein, it being the purpose of this invention to derive a digital numerical value for utilization by an electronic control device including such an arithmetic unit which in turn controls a hydraulic control to modulate or throttle the hydraulic pressure supplied to the brake of the rotatable part, it being understood that digital arithmetic unit of the types well known in the art are suitable.

An output line 16 of the second register 14 is connected via line 17 to the negative input of the adder 4. In addition, the output of second storage register 16 is also connected via connecting line 100 to the arithmetic unit which is not illustrated. A clock line 19 which is the output of clock generator 18 is connected with the clock inputs of all the components.

From the arrangement illustrated in FIG. 1, the following mode of operation results for the phase locked loop device of this invention: Any input pulse arriving on line 1 is given a certain sign in the totalizer 2 by means of totalization to a certain digital numerical value. Upon the arrival of the next clock pulse which comes from clock generator 18 via its output line 19 the digital numerical value in totalizer 2 is routed to adder 4 where it is processed. Thus any clock pulse determined by the clock generator 18 implies that a digital numerical value is available as a computing result at the output 6 of adder 4 with the digital numerical value thereof corresponding to the difference between the digital numerical values supplied to the input 5 from totalizer 2 and to the negative input 7 of adder 4. Thus, the digital numerical value available at the output 6 of the adder 4 is applied to the first storage register 9 where it is added to its content, observing the correct signs. With each clock pulse the entire content of the storage register 9 are checked by detector 11 to determine whether or not the contents of storage register 9 have either fallen below a fixed lower limit or exceeded a fixed upper limit. The contents of storage register 9 remain unchanged during this action. If the detector 11 determines that the contents of storage register 9 is falling below the lower limit it produces a signal at its output 12 whereby the contents of the second storage register 14 will be reduced by a fixed negative digital numerical value. When the detector 11 determines that the contents of storage register 9 are above the upper limit set into detector 11, the detector 11 will produce a signal at its output 12 by means of which the content of storage register 14 will be increased by a fixed positive digital numerical value. In that case, the signal produced by detector 11 at its output 12 may be of such a nature as to always affect an increase of reduction of the same extent to the content of storage register 14. With respect to this particular embodiment, however, it is also possible, without any difficulty, to have the increase of the store 14 effected by a means of absolute value different from that of reduction in the content of storage register 14. Furthermore, it is easily possible that the absolute value, by means of which there is an increase of reduction, respectively, is effected in the content of storage register 14 will depend on how much the content of storage register 9 have fallen below or exceed preselected limits.

The contents of storage register 14 is available as a digital numerical value at its output 16 and can be available for further use through an arithmetic unit for use with any clock pulse. It is also routed to the negative input 7 of the adder 4 with each clock pulse. Thus the arithmetic unit (not shown) receives an indication of the average acceleration or the frequency of the input pulse sequence via the line 50.

In order to better understand the device illustrated in FIG. 1, the following is a typical working example of that device. To begin with it is assumed that the phase-locked loop illustrated in FIG. 1 is in a steady state, in other words, the frequency of the input pulse sequence is not changing. In order to understand this more easily, a condition has been chosen in which the frequency of the input pulse sequence is exactly one-half the pulse frequency of the pulse train generated by clock generator 18. In other words, for every other clock pulse there is one input pulse. The input pulse is always routed as a fixed digital numerical value with preferably a higher absolute value via the totalizer 2 to the input 5 of the adder 4. In the steady state condition of the phaselocked loop illustrated in FIG. 1, there is a positive digital numerical value in the storage register 14. The absolute value of the digital numerical value being exactly one-half the digital numerical value received by totalizing the input pulse. If in this example the lower limit to which the detector 11 will respond is fixed at zero and if the upper limit is fixed at a value slightly above the digital numerical value generated by the totalizer 2, the detector 11 will not generate any output signal as long as there is no change of the frequency of the input pulse sequence. Based on the further assumption that also, during the clock pulse considered first, an input pulse is present which is routed as a digital numerical value to the input 5 of the adder 4, that the digital numerical value, which was routed from the storage register 14 to the negative input 7 of the adder 4 and which is half the digital numerical value, will be subtracted from the digital numerical value from adder 4 with remaining difference in absolute value, which is this case equals the value of the contents of the store 14 being read as positive digital numerical value into the first storage register 9. Since thus the upper limit of the contents of the storage register 9 has not been exceeded, the detector 11 consequently will not produce any output signal to the second storage register either. Thus, the contents of the second storage register 14 in this example, will remain unchanged.

During a subsequent clock pulse, there is no input pulse since the computing frequency of the clock is twice as high as the frequency of the input pulse sequence in this example. Therefore, during this subsequent clock pulse no digital numerical value will be available at the input 5 of adder 4. At the negative input 7 of the adder 4, however, there is the digital numerical value defined by the content of the second storage register 14. With that value being read as a negative value into storage 9. Since a positive value of the same magnitude was already present in the storage register 9 the content of storage register 9 will be brought to 0. Thereby, however, the condition is such that the lower limit in detector 11 has not yet occurred in consequence of which even during the subsequent clock pulse no output signal will be generated by the detector 11 for the purpose of correcting the condition of the second storage register 14.

During the next subsequent clock pulse, again, there will be an input pulse and again a digital numerical value will be routed to the input 5 of adder 4. Thus, there will result the same sequence as during the clock pulse considered above first.

Now another frequency of the input pulse sequence will be considered which results during an acceleration of the rotatable part. With frequency of the input pulse sequence increasing, input pulses will not only arrive upon every other clock pulse but instead more frequently. Therefore, the content of storage register 9 will no longer be zero. The content of the second storage register 14 constitutes a digital numerical value, the absolute value of which is exactly one-half the digital numerical value generated by the totalizer 2 by any input pulse sequence. Therefore, in this case the contents of storage register 9 will continue to increase until the upper limit has been exceeded. As soon as that occurs, the detector 11 will produce a signal at its output 12 by means of which the content of the second storage register 14 will be increased. Upon the steady state condition being reachieved, thereby again it will result that the content of the first storage register 9 will be kept within the predetermined limts. As can be easily deduced from the above discussion in the steady state the relation of the pulse frequency generated by the clock generator 18 to the frequency of the input pulse sequence always equals the relationship of the digital numerical value generated by totalizer 2 to the digital numerical value existing at storage register 14. As long as this condition is not met, there will be a permanent correction of the content of the storage register 14. Because of the absolute value of the digital numerical value by means of which the correction of the storage register 14 is effected upon respectively exceeding the upper limit or falling below the lower limit, the tracking behavior of the phase-locked loop illustrated in FIG. 1 is a dependent one. The said digital numerical value must be limited to absolute values both in a negative and positive sense in which the numerical value of the loop illustrated in FIG. 1 will be stable and any tendency towards excessive oscillation will be sufficiently suppressed. However, the preselected absolute value being very small, it will take a corresponding large number of computing clock pulses until the contents of the second storage register 14 will have been adapted to the changed conditions. In this context, the words "small" or "large" must be considered with regard to the digital numerical value produced by the totalizer 2.

If, in order to rate the phase-locked loop device of this invention one considers its application in an antiskid control system in which the frequency of the input pulse sequence covers a range from about 5 cps to 5 kcps, it is possible to rate the clock pulse at about 10 kcps and to limit the above referred to absolute value ±1, said absolute value correcting the content of the second storage register 14. With such a selection of rating values, any input pulse can be totalized to a digital numerical value of, for example, a magnitude of 1,000. It should be pointed out at this time, however, that such specifications with regard to the design rating of the device of this invention should only be considered as an example of the relationship of the individual magnitudes with regard to each other since the designed rating with regard to any specific application in any specific antiskid control system must be optimized by tests.

Figure 2:
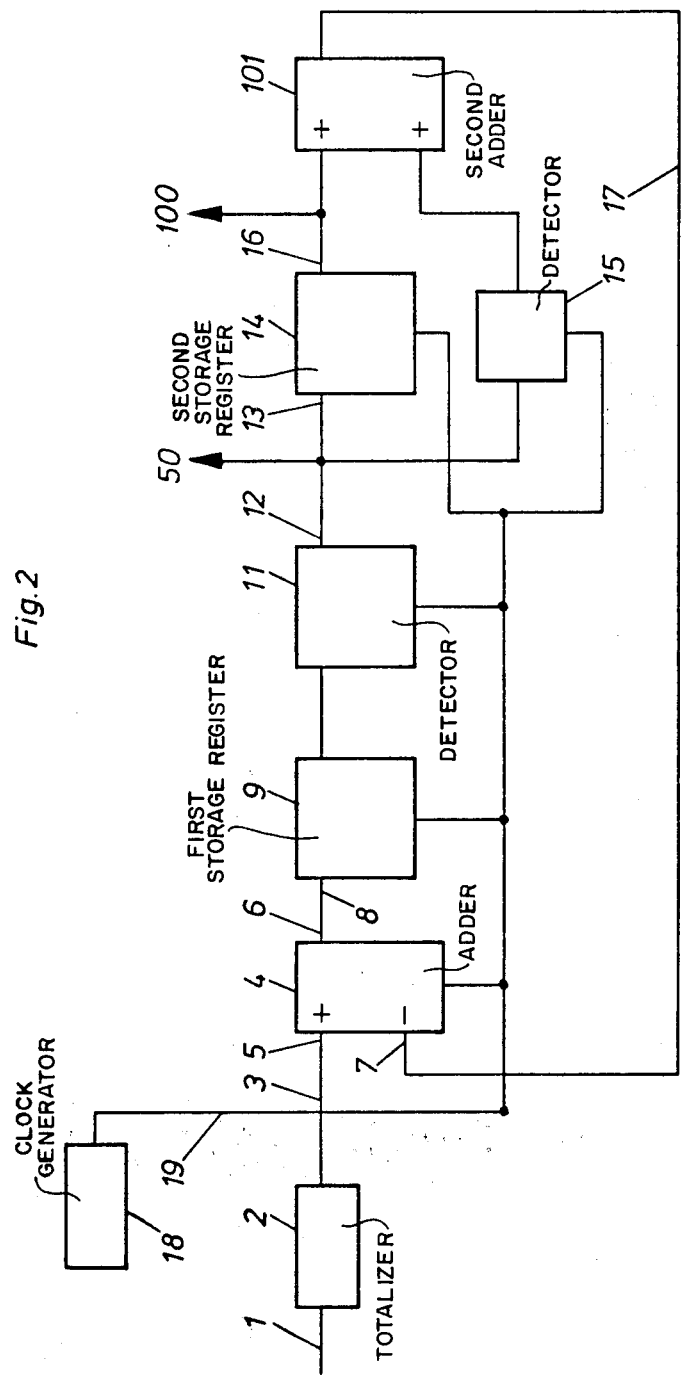
FIG. 2 is a block diagram illustrating the basic construction of the device of this invention, including an additional stabilization branch, of the form illustrated in FIG. 1.

Referring now to the device illustrated in FIG. 2, the basic principles of the phase-locked loop device of this invention are identical to those illustrated in FIG. 1 and the same elements are given the same refernce characters. It is not necessary to describe those elements again in connection with the form of the embodiment illustrated in FIG. 2. In the embodiment of FIG. 2, at the output 12 of detector 11 there is provided with a further detector unit 15 which is connected for additional stabilization of the phase-locked loop device of this invention. The unit 15 will always generate an output signal when detector 11 determines, respectively, the exceeding of or falling below the predetermined limits. The output signal generated by unit 15 consists of a digital numerical value which will be negative or positive depending on whether or not detector 11 has ascertained, respectively, exceeding or falling below the predetermined limits. In the connecting line between the output 16 of the second storage register 14 and the negative input 7 of adder 4 a second adder 101 is connected, the second input of which is connected with the output of unit 15 so that the output of adder 10 and an additional digital numerical value will be routed to the adder 4. This provides the means by which the stabilization of the phaselocked loop device of this invention will be enhanced since there is always an oscillation tendency present in such loops which must be suppressed and thus the device as illustrated in FIG. 2 provides for a device in which relatively high resolution is made possible.

Figure 3:
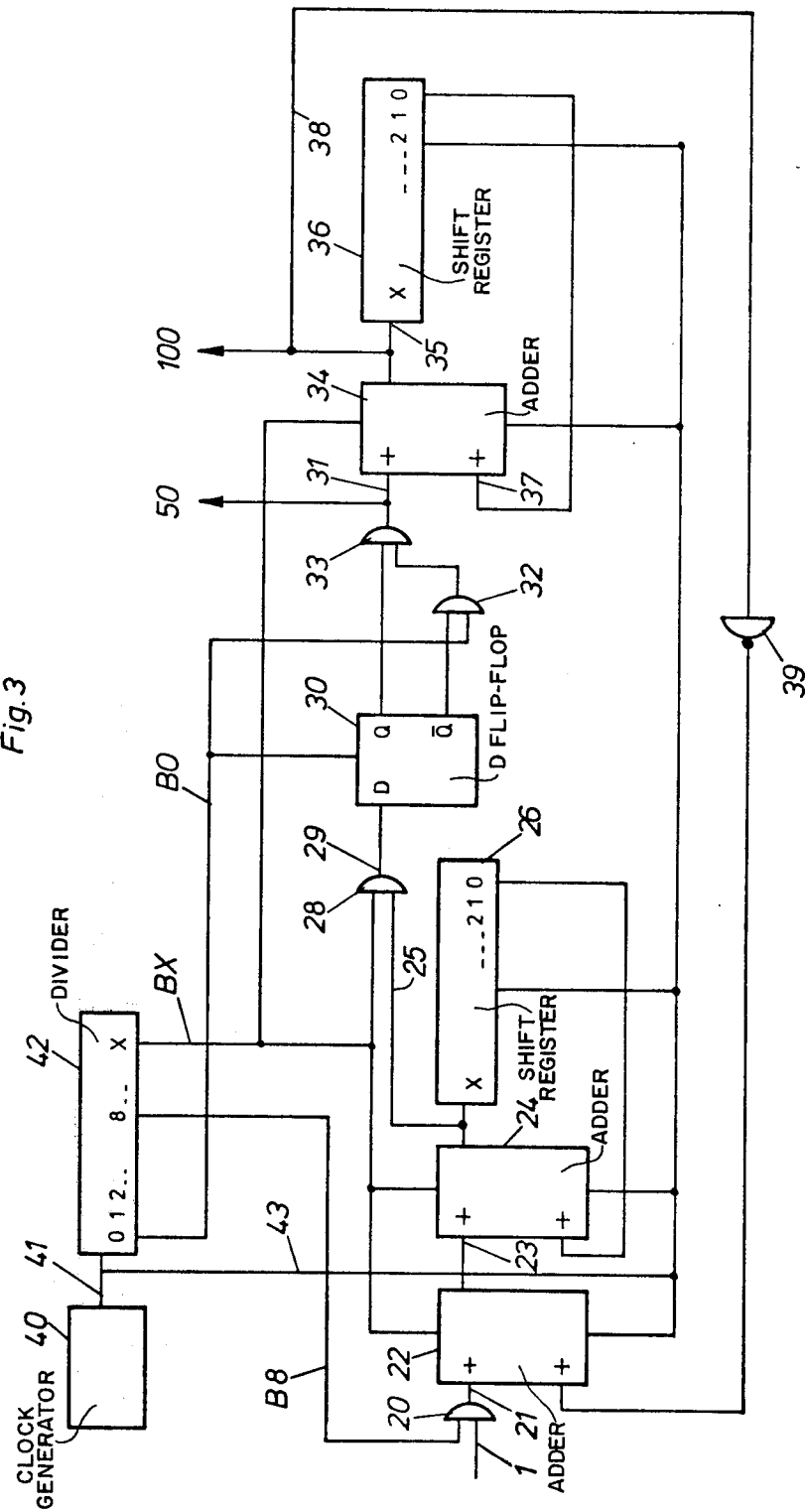
FIG. 3 is a block diagram of the device of this invention featuring a construction with serially operating components.

In FIG. 3, a block diagram illustrates an embodiment of the device of this invention using serially connected components. In the embodiment of FIG. 3, the input line 1 from the wheel sensor (not shown) is applied to an input of an AND-gate 20. Line 1 thus is connected with the speed pick-up through a synchronizer which are components well known in the art and are not illustrated. The synchronizer function to synchronize the input pules sequence generated by the speed pick up or sensor to the clock pulse in order that any input pulse sequence will be present at the input of the AND-gate 20 for exactly one entire computing cycle at a time. The output of AND-gate 20 is connected via line 21 as the first input of an adder 22. Line 23 takes the output of adder 22 and connects it to the first input of an adder 24. Output line 25 of adder 24 is connected with an input of a shift register 26, the output of which is connected to the second input of adder 24 via line 27. The output of adder 24 is also connected to a first input of an AND-gate 28 at output 29, which is connected to the input of a D-flip-flop 30. The $\bar{Q}$ output of the D-flip-flop 30 is directly connected with a first input 31 of adder 34 through OR-gate 33. The Q output of D-flip-flop 30 is connected to a first input of an AND-gate 32, the output of which is connected with the input 31 of the adder 34 via OR-gate 33. The output 35 of adder 34 is connected with an input of shift register 36, the output of chich is connected to the second input 37 of adder 34. The output 35 of adder 34 is led to the second input of adder 22 through an inverter 39. Also at the output 35 on line 100 is connected to a suitable arithmetic unit which is not illustrated but is of the type described above. In addition, the line 50 leads to the same arithmetic unit and is connected at the output of OR-gate 33. A clock generator 40 generates a master pulse and is connected with a divider 42 through line 41. From line 41 a line 43 branches off and is connected with the clock inputs of adders 22, 24 and 34 and of the shift registers 26 and 36. The divider 42 functions to switch the master clock pulse generated by the clock generator 40 to weighting lines B-0 to B-X. The number of weighting lines B-0 to B-X in this arrangement is dependent on the digit capacity of the shift registers 26 and 36. In the arrangement illustrated in FIG. 3, the divider 42 will function so as to effect switching of the first master clock pulse of the computing cycle generated by the clock generator 40 to the weighting line B-0 which is defined as the lowest value digit of a serial binary number. The subsequent master clock pulse will then be switched to weighting line B-1. This operation of each subsequent clock pulse's being switched to the weighting line which comes next in value will continue until the weighting line B-X has been reached. Then the computing cycle will be finished and the subsequent master clock pulse will then be switched to the weighting line B-0, the same operation being repeated. The master clock pulse B-0 to B-X will hereinafter be called a digit clock pulse. As can be readily appreciated by those skilled in the art the operation of divider 42 at the beginning of any computing cycle is thus defined by a digit clock pulse in the weighting line O.

Upon the arrival of any master clock pulse, adders 22, 24, 34 will carry out an addition of the signals available at their two inputs, this addition being due to the direct connection of the clock inputs of the adders 22, 24, 34 with the master clock pulse carrying line 41 via the line 43. As shift registers 26 and 36 are also supplied with the master clock pulse the information stored with then at storage location X will be shifted onto storage location X-1 upon the arrival of the master clock pulse. Upon the arrival of the master clock pulse the information stored at location O will be at the output shift registers 26, 36. That information will thus be available at the second input of adders 22, 34 via, respectively, the lines 27 or 37 when the master clock pulse arrives. Immediately after the arrival of the master clock pulse this information will be lost and replaced by the information which was previously stored at the storage location 1.

In this operation the sign will be defined by the highest value digit X. Therefore, the reset inputs of the adders, 22, 24 and 34 are connected with the weighting line B-X. If a digit pulse is available at the reset inputs of adders 22, 24 and 34 the transferring function will become inoprative, in other words no carry will be stored even if, with the thus simultaneously available master clock pulse, a signal is applied to both inputs of the adders 22, 24 and 34 which corresponds to a logical 1 and indicates a negative sign in accordance with the above definition. Therefore, the device operates so that it is prevented from acting upon the addition of two negative numbers so that a carry will be taken over to the subsequent computing cycle which would falsify the end result.

Thus in the embodiment of FIG. 2 illustrated in FIG. 3 the upper and lower limit referred to above are defined by the change in signs. In other words, in this case the two limits coincide. In order to ascertain whether or not there is either an exceeding of or falling below the limit all that is needed is to tell whether the contents of the shift register is positive or negative. This will be done by the AND-gate 20, the second input of which is likewise connected with the weighting line B-X. At the output of the AND-gate 28 there will be a signal if the highest value digit in shift register 26 corresponds to a logical 1, which means that the content of the shift register 26 is negative. The information at the output of AND-gate 28 will be routed to the input of the D-flip-flop 30 and taken over by the digit clock pulse and the Q output and inverted to the $\overline{Q}$ output in correspondence with the action of a D-flip-flop, the digit clock pulse being defined by the weighting line B-X. From the well known and understood operation of a D-flip-flop 30 it will result that, with negative contents of the shift register 26, during the entire subsequent computing cycle, a logical 1 will be at the Q output of the D-flip-flop 30 and at the first input 31 of the adder 34, said logical 1 being added to the respective digit content of shift register 36 upon the occurrence of any master clock pulse. However, if one adds a logical 1 to the contents of a shift register upon the occurrence of any master clock pulse, the contents will altogether be reduced by "one", i.e., when determining the final result 1 will be substracted from the contents of shift register 36.

If the contents of shift register 26 are positive it will be impossible for any input signal to arrive at the D-flip-flop 30 through the AND-gate 28. In this event a signal will be available for the subsequent computing cycle at the $\overline{Q}$ output of the D-flip-flop 30 for the duration of the entire subsequent computing cycle. Since such a signal, however, can only reach the input of adder 24 through AND-gate 32, the second output of which is connected with the weighting line B-0 or through the OR-gate 33, in this event, a logical 1 will be at the first input of the adder 24 during the digit clock pulse 0 only. Therefore, only +1 will be added to the contents of shift register 36.

In the well-known device which generates the input pulse sequence, such input pulse sequence which is supplied to the device in accordance with FIGS. 2 or 3 is passed through a trigger which squares the input pulses generated by the pick up of measured values and synchronizes them to the computing cycle so that an input pulse will always be available during a period of only one computing cycle. Through input line 1, these input pulses are available at the first input of AND-gate 20, the second input of which is connected to one or several of the weighting lines. In the embodiment illustrated in FIG. 3, in accordance with the principles set forth in FIG. 2, weighting line B-8 is chosen for the purpose of better illustrating the effect achieved by this construction. Because AND-gate 20 is connected to weighting line B-8, a logical 1 can be available at the output of AND-gate 20 only for the digit clock pulse 8 if there is also an input pulse at the first input of AND-gate 20. Therefore, in this event, only a signal corresponding to a logical 1 is routed to adder 22. In all other digit clock pulses a logical 0 will therefore be at the input of logical 22. Thus, through the input line 21, a binary number is carried over which would result in the binary number "0100000000". If the total digit capacity is 10 digits, i.e., X=9. Converted to the decimal system, this binary number will render the decimal number "256". Thus, the AND-gate 20 takes over the allocation of the input pulse to binary numbers of always the same value.

Taken together, there results the following mode of operation for the embodiment illustrated in FIG. 3 of the device illustrated in principle in FIG. 2:

Upon the arrival of an input pulse at the input line 1 within one computing cycle the binary number allocated between AND-gate 20 is routed to the first input 23 of adder 22. At the same time, within this computing cycle, a binary number will be available at the second input of adder 22 from the inverter 39, that binary number having been placed in the shift register 36 during this computing cycle. Due to the inversion, by means of the inverter 39, the binary number supplied to the second input of adder 22 during this cycle corresponds to a negative binary number reduced by one, which is supplied to the shift register 36. In this context, it should be pointed out that in accordance with the basic principle of the device of this invention, the binary number supplied to the second input of adder 22 should exactly correspond to the negative binary number routed to the shift register 36. This can be easily obtained by means of corresponding construction of available technical devices. Inasmuch, however, in terms of current device technology, it is much easier to invert a binary number instead of negating it, this is the manner which has been used in the practical embodiment illustrated in FIG. 3 of the device shown in FIG. 2. The error resulting therefrom is negligible since, in the design rating of an entire device which satisfies practical requirements, the absolute values of the invididual binary numbers can be chosen relatively to be high, the difference of "+ −" not having any disturbing effects.

The adder 22 thus performs a calculation to determine the difference between the binary number at the first input and the inverted binary number routed through shift register 36 in a computing cycle during which an input pulse is available.

For further consideration of the mode of operation of the device illustrated in FIG. 3, it shall be assumed that during the preceding computing cycle that an operating state are accidentally reached in which the content of the shift register is exactly equal to 0. Since, in conformity with the basic principle of the device of this invention, the contents of shift register 36 is always smaller than the binary number allocated by AND-gate 20, in this computing cycle the adder 22 will form a positive difference which will be routed to the adder 24 and read into shift register 26.

At the same time, the binary number read into shift register 26 is available at AND-gate 28, the second input of which is connected to the weighting line B-X. Since the binary number read into the shift register 26 and available at AND-gate 28 is positive, there will be no signal corresponding to the logical 0 at the AND-gate 28 via line 25 during the last master clock pulse of the computing cycle. The master clock pulse corresponding to the digit clock's pulse X defines the sign, as was prescribed above. Thus at the input of the D-flip-flop there will be no signal, either, by means of which the Q output of D-flip-flop 30 is switched into the state of logical 0 or remains in said state or by means of which the Q output of the D-flip-flop 30 is switched into the state of logical 1 and remains in that state. Thus, there is a signal at the first input of the AND-gate 32 for the subsequent computing cycle, said signal reaching the first input 31 of the adder 34 as binary number −1 since the weighting line B-0 is connected at the second input of AND-gate 32.

When considering the subsequent computing cycle it should be remembered that, as it has been prescribed, the frequency of the clock generator 40 exceeds the frequency of the input pulse sequence. This implies that during the subsequent computing cycle there will be no inut pulse at AND-gate 20.

With regard to the computing cycle to be discussed now, the binary number in shift register 36 will be increased by the binary number +1 which is available via the AND-gate 32 and the OR-gate 33 which will also be supplied to the arithmetic unit (not shown) through line 100. The binary number increased by +1 again is routed to the second input of adder 22 via the inverter 39. Since there is no input pulse there is no binary number at the first input of the adder 22. This binary number is routed unchanged to the first input of adder 24. The adder 24 adds this binary number to the existing binary number available in shift register 26. This binary number actually being substracted due to the negative sign, so that after the termination of this adding operation the new binary number available in the shift register 26 is reduced by the inverted binary number available in the shift register 36.

If, due to the arithmetic operation carried out by the adder 24 the binary number to be read into shift register 26 becomes negative, there will be a signal at the first input of the AND-gate 28 upon the occurrence of a digit clock pulse X. Inasmuch as, at the time of the digit clock pulse X there is also a signal at the second input of the AND-gate 28 through weighting line B-X, a signal is formed at the output of the AND-gate 28, said signal corresponding to a logical 1 and being available at the input of D-flip-flop 30. Thus the flip-flop 30 is switched into a state at which there is also a signal at the Q output while there is no signal at the $\overline{Q}$ output, in this particular instance. Since the Q output of the D-flip-flop is directly connected with the first input of the adder 34 there will be a logical 1 at the first input of adder 24 with any digit clock pulse of the subsequent computing cycle. There results that, during the subsequent computing cycle, the binary number available in the shift register 36 will be reduced by 1.

If an input pulse is again available during the subsequent computing cycle the same operation is repeated as in the previously described computing cycle, since the binary number reaching the shift register 26 will again become positive due to this input pulse.

As can be readily understood from the above the binary number in the shift register 36 is reduced by 1 during the first computing cycle and will be reincreased by 1 during the second computing cycle if the device of this invention as illustrated is in the steady state when there is an input pulse during every other computing cycle. The binary number in the shift register 36 will thus permanently cycle between two binary numbers differing around the absolute value 1. If one takes into consideration in the design rating of the device of this invention it is being optimized, the binary numbers available in the shift register 36 could easily reach the value 1,000 at the maximum vehicle speed of, assumedly 200 km/hr, then the difference of 1 will correspond to 0.2 km/hr.

In this context it should be pointed out that the line 50 also leads to the arithmetic unit (not shown). In the steady state, during a number of computing cycles there will always be the same number of binary numbers having the value of +1 and the value −1. On the average, the result will be 0, which means that there is no speed change, i.e., that no speed acceleration or speed deceleration of the wheel to be braked is occurring. In the event in a change of wheel speed, which varies numbers of binary numbers having the value +1 and −1, that variable result will be supplied to the arithmetic unit on line 50. On the average, a positive or negative binary number results which indicates the degree or rate of the speed change. This varying binary number, having the value +1 and −1, is also available at the input of adder 34, to the effect that the binary number in the shift register 36 is always tracked to the actual wheel speed. Upon changes in the wheel speed the device of this invention is thus permanently aiming to reachieve the steady state by continuously adapting the binary number in the shift register 36 to the actual wheel speed.

With regard to the above numerical example it should also be understood that of course in the event of a binary number which is rated to reach about 1,000 in shift register 36 for the maximum speed of the vehicle it is required that the AND-gate 20, for the coding of the input pulse, be connected to a weighting line having a higher digit value than shown in FIG. 3. With regard to the embodiment of FIG. 3 in principle there also applies the same relations of the individual magnitudes with respect to each other as they were defined in FIGS. 1 and 2.

Figure 4:
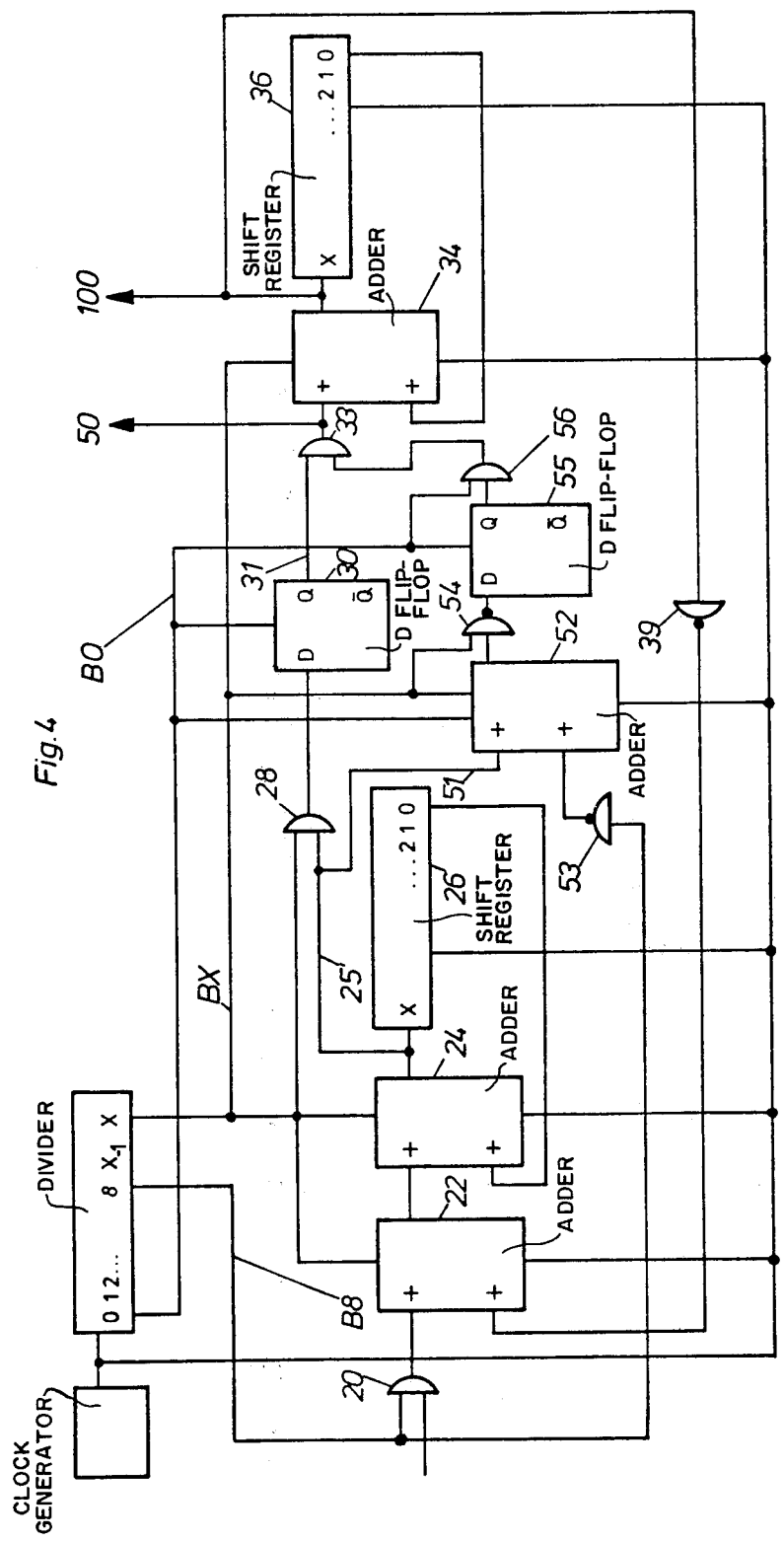
FIG. 4 is a further diagram of the device of this invention which embodiment is similar to that illustrated in FIG. 3 having variable limits.

The further embodiment illustrated in FIG. 4 in principle operates with components in a serial computer form utilizing techniques similar to that illustrated in the embodiment of FIG. 2. Furthermore in the arrangement of FIG. 4 the basic construction also corresponds to the embodiment illustrated in FIG. 3. The main difference consists in providing, for the purpose of avoiding the permanent counting up and counting down of shift register 36, the improvements in the device of this invention which involves introducing varying upper and lower limits. The binary number in shift register 36 will thus not be increased merely if the sign of the binary number coming from the adder 24 is positive. The binary number in shift register 36 will not be increased until the binary number coming from the adder 24 has a value exceeding the binary number routed to the first input of the adder 22. The fact that this binary number is more negative by 1 as compared with the binary number of the first adder 22 again is base on the fact that, for the purpose of easier incorporation with respect to practical technical device, the weighting line B-8 connected at the AND-gate 20 is inverted for the determination of this limit. It is of course, possible to determine another limit at random by using one of the other weighting lines. The embodiment of FIG. 4 is provided solely to demonstrate one of the ways of further improvement of the device in accordance with the embodiment illustrated in FIG. 3. Accordingly therefore, in the embodiment of FIG. 4 the lower limit is also further defined by the existence of a negative binary number coming from the adder 24, as is the case in the embodiments of FIGS. 2 and 3. Of course, there also, a certain binary number determinable at random could serve as limit value.

In addition to the elements described above in connection with the embodiment of FIG. 3, a first input 51 is provided a further adder 52 which is connected to the output of the adder 24 in the embodiment illustrated in FIG. 4. Thus during any computing cycle the binary number coming from the output of adder 24 is available at the first input of the adder 52. A second input of the adder 52 is connected through inverter 53 with the same weighting line which the second input of the AND-gate 20 is likewise connected with.

An output of adder 52 is connected with a first input of an AND-gate 54, inverted at the output. A second input of AND-gate 54 inverted at the output is connected with the weighting line B-X, which defines the sign. The inverted output of AND-gate 54 is connected with an input of a second D-flip-flop 55. The Q output of second D-flip-flop 55, supplied to a first input of AND-gate 56, is connected to the weighting line B-0. An output of AND-gate 56 is supplied as the input of adder 34 via OR-gate 33.

In order to understand the mode of operation of the embodiment of FIG. 4, the working example set forth below, of the phase-locked loop device operating with decimal numbers, will be described. At first there will be an input pulse upon every fourth computing cycle. In this respect it is again pointed out that this numerical example-as that of FIG. 3 where the decimal number 256 is allocated to any input pulse by means of the weighting line B-8 only is to serve the purpose to further explain the device of this invention. The design rating or specification or selection of these numbers for actual application depends on the resolution of the signal emitted by the adder 36 which will be required for the specific application involved. Thus, for demonstration purposes in this example it shall be assumed that the 256 is allocated to any input pulse. Further, it shall be assumed that the lower limit is preselected at 0, the upper limit being selected at 256. The lower limit 0 results from the fact that with the negative value at the output of adder 24, the AND-gate 28 will process a signal to the D-flip-flop 30. The upper limit of 256 results from the fact that upon the exceeding of that limit, i.e., from a value of 257 upwards the inverted output of AND-gate 54 produces a signal to the D-flip-flop 55. If now it is further assumed that the value 63 is available in shift register 36, i.e. that the number of −64 is available at the second input of the adder 22, that number - since the device will be supposed to already be in the steady state-corresponding to that wheel speed at which an input pulse is available upon every fourth computing cycle, there will result the following:

During the first computing cycle 256 is supplied to the first input of adder 22, −64 is supplied to its second input. Thus the adder 22 will produce 192 to the first input of adder 24. That 192 will be read completely into the shift register 26 since the latter was at 0 until then and thus no value had been led to the second input of the adder 24. That 192 is also available at the AND-gate 28 which will not generate any output signal, this value being positive as a result of which the Q output of D-flip-flop 30 is or remains at 0. The 192 is also available at the first input of the adder 52, at the second input of which there is 257. The output of the adder 52 will thus produce a signal corresponding to -65 such as to prevent the inverted output of the AND-gate from producing any signal and consequently also to the effect that the Q output of the D-flip-flop 55 is or remains zeroed.

During the second computing cycle no signal will be provided to the first input of the adder 34 since both the Q outputs of the D-flip-flops 30 and 55 do not carry any signal. The previously available value 63 is led from the shift register 36 to the second input of the adder 34. Thus at the output of the adder 34 the value 63 will reappear which will be reread into the shift register 36 and routed to the second input of the adder 22, after having been inverted to −64. During the second computing cycle there will be no signal to adder 22, thus the value −64 being available unchanged at the output of the adder 22 and hence at the first input of the adder 24. During the second computing cycle, the value 192 available in the shift register 26 will be available at the second input of the adder 24, consequently the value 128 being available at the output of the adder 24 and read into the shift register 26. As this value 128 is also positive, the AND-gate 28 will equally be unable to reproduce any output signal during the second computing cycle. The Q output of the D-flip-flop consequenly continuing to remain logically zeroed. The addition by the adder 52 again will render a negative value during this computing cycle. Also the Q output of the D-flip-flop 55 thus also remaining logically zeroed.

During the third computing cycle therefore again no change will occur in the number 63 in the shift register 36. If one continues this computing operating until the end of the fourth computing cycle it will be noted that in the shift register 26 there is the value 0, whereupon the fifth computing cycle will pass as the first. Since there will be no upper or lower limit respectively, in this way, this means that the absolute amount of the number such as −64 available at the second input of the adder 22 corresponds to the input frequency (in this example ¼ of the computing clock frequency) in the steady state. The existence of a number deviating from -64 would merely mean the amount exceeding or falling below the upper or lower limits, whereby the contents of register 36 will be changed continuously until the steady state will have been reachieved.

If at this point a change occurs in the frequency of the input pulse sequence from 256 selected in this example the number in this computing cycle thus would exceed or fall below respectively the upper or lower limit correspondingly going on and occurring more frequently until the number in the shift register 36 and at the second input of the adder 22, respectively, will have been adapted to the new frequency of the input pulse sequence.

Concluding it should be pointed out that if the number in the shift register 36 is selected to be very high due to the arithmetic unit connected by the line 100, the step of $+1-1$ being too small for the number in the shift register 36 so that said number would be too slow in adapting itself to changes in the frequency of the input pulse sequence, it is readily possible to apply the Q output of the D-flip-flop 30 and 55 through gate circuits thereby defining another step. It is also quite possible in this arrangement to provide for a different step in respect to the increase of the number contained in shift register 36 when the upper limit is exceeded and vice versa for the reduction of the number contained in the shift register 36 when the lower limit is passed in the downward direction. This latter arrangement has the advantage in several applications that the number in the shift register 36 can easily be tracked to a deceleration in the frequency of the input pulse sequence whichwill correspond to a wheel speed deceleration, while it is slow in tracking an acceleration in the frequency of the input pulse sequence which will correspond to a wheel speed acceleration.

In order to avoid unnecessary high values in rating the capacity of the shift register, it is possible to limit the contents of the register to values slightly above the upper and slightly below the lower limit.

While the above invention has been described in the several embodiments, it will be appreciated by those of skill in the art that modifications may be made which do not depart from the scope of the appended claims.

What is claimed is:

1. A digital phase-locked loop for speed measurement, in particular for use in antiskid control systems, for the conversion of the frequency of an input pulse sequence which is proportional to the speed of a rotatable member into a digital numerical value suitable for use in a digital arithmetic unit including:
    input means for providing a certain numerical value which will always be the same and which is allocated to any input pulse sequence;
    at least one adder means having at least three inputs thereto and at least one output, one of said inputs of said adder being connected to said input means;
    first storage register means having one input connected to and receiving the output of said first adder means, having at least another input for receiving clock pulses;
    means for generating clock pulses;
    detector means having a selected predetermined upper limit and a predetermined lower limit having one input connected to the output of said first storage register means, said detector means having another input connected to said means for generating clock pulses and generating at regular intervals a positive digital output numerical value when the content of said first storage register is above said predetermined upper limit and generating a negative digital output numerical value when the contents of said first storage register are below said predetermined lower limit;
    second storage register means having one input connected to said detector means and having at least one other input receiving clock pulses from said means for generating clock pulses;
    means for connecting the output of said detector means to said arithmetic unit also to said one input of said second storage register while maintaining the correct sign, whereby the content of said second storage register is the digital numerical value corresponding to the frequency of an input pulse sequence;
    means connecting said second storage register to said means for generating said clock pulse and for connecting the output of said second storage register to both said arithmetic unit and another input to said adder means whereby said digital numerical value in said second storage register is always subtracted from the content of said first storage register upon the occurrence of each clock pulse generated by said means for generating said clock pulse.

2. The phase-locked loop device as set forth in claim 1 wherein said clock generator has a frequency which at least equals or exceeds the highest input pulse frequency to be converted into a digital numerical value.

3. A phase-locked loop device as set forth in claim 1, including further adder and multiplier means connected between the output of said second storage register and said adder means so that the digital numerical value output of said second storage register to said adder means is operated on in said further adder and multiplier means.

4. A device as claimed in claim 3, wherein said means for generating clock pulses includes generation of a pulse which is supplied to all serially operating elements, and including a divider means which cyclically distributes the clock pulse to a plurality of weighting lines 0 to X, whereby a digit clock pulse can be generated which will define a digit value from 0 to X during each computing cycle; and wherein the input pulse will always be available at an input gate circuit means during the entire subsequent computing cycle, said input gate circuit means being opened for the coding of said input pulse by means of the digit clock pulse available in one or more of said weighting lines.

5. The device as claimed in claim 4 including means for determining that the sign is always defined by the highest value digit and further including means defining a D-flip-flop means connected to the first storage register between the first adder means and a shift register through a first gate circuit which is opened by the highest value digit clock pulse X, the Q output of said D-flip-flop being connected to a separate adder associated with said second storage register and further including means for providing that a first input of an additional adder is connected at the first storage register between said first adder and a shift register, the second input of said further adder receiving the negative or inverted binary number of the upper limit; and further including means for providing that an output of the further adder is connected with a second D-flip-flop means through a further gate circuit having an inverted output which is opened by the highest value digit clock pulse X, the Q output of said second D-flip-flop being connected with the adder associated with said second storage register through a separate gate circuit which is openable by the lowest value digit clock pulse 0.

6. A device as claimed in claim 5 including means for providing that said gate circuit defines an equal binary number having inverted signs for the connected outputs of said two D-flip-flops.

7. A phase-locked loop device as claimed in claim 1 including means for converting said input pulse frequency to a digital numerical value in the form of a serial binary number and wherein said storage registers are shift registers.

8. A device as set forth in claim 1 wherein said means for generating clock pulses is connected to dividing means for subdividing said master clock pulse having the digit capacity of 0-X, wherein first and second storage registers are shift registers having a digit capacity of 0-X and wherein said adder means are each connected in series and operate serially and each have a carry-over function.

9. A device as claimed in claim 8 including means for defining the sign by the highest value digit and further including gate D flip-flop circuit means forming said detector connected to said first storage register between said adder means and said first shift register means, said gate being opened by the highest value digit clock pulse which is also supplied to the clock input of said D-flip-flop and further including means providing that a Q output of said D-flip-flop is directly connected with a second adder associated with said second storage register while a $\overline{Q}$ output is connected with said second adder via a second gate circuit which is opened by the weighting line B-0 of the lowest value digit.

10. A device as claimed in claim 9 further including means for providing that the said gate circuits provide equal weighting lines B-0 to B-x for the two connected outputs of said two D-flip-flops, said weighting lines containing inverters for the gate circuits of either outputs of said flip-flops.

11. The device as claimed in claim 1 wherein means are provided so that said upper and lower limits are commonly defined by the change in sign of the binary number in said first storage register.

12. A device as claimed in claim 11 further including means for providing that the outputs of the separate D-flip-flop means are connected with the adder means associated with said second storage register through gate circuits opened by one or several digit clock pulses 0 to $x$ so that, upon the existence of any signal at any of the connected outputs of said D-flip-flops, a binary number is supplied to said adder associated with said storage register, said binary number being defined by said gate circuit.

13. The device as claimed in claim 1 wherein means are provided so that the said lower limit is defined by 0 and said upper limit is defined by a positive value determinable at random.

* * * * *